United States Patent [19]

Tomite et al.

[11] Patent Number: 4,745,319
[45] Date of Patent: May 17, 1988

[54] MAGNETO D.C. MOTOR HAVING ELASTIC MAGNET MOUNTING RETAINERS

[75] Inventors: Tosio Tomite; Shotaro Naito, both of Katsuta; Nobuhiko Ogasawara, Mito; Tatsuhiro Tani; Hidemitsu Kobayashi, both of Katsuta, all of Japan

[73] Assignee: Hitachi, Ltd., Tokyo, Japan

[21] Appl. No.: 707,032

[22] Filed: Mar. 1, 1985

[30] Foreign Application Priority Data

Mar. 7, 1984 [JP] Japan ............................ 59-41970
Mar. 28, 1984 [JP] Japan ............................ 59-58311

[51] Int. Cl.⁴ .......................................... H02K 21/26
[52] U.S. Cl. .................................... 310/154; 310/254
[58] Field of Search ............... 310/42, 91, 153, 154, 310/185, 188, 218, 254, 258

[56] References Cited

U.S. PATENT DOCUMENTS

| 2,971,107 | 2/1961 | Jin | 310/258 |
| 3,056,896 | 10/1962 | Ludemann et al. | 310/258 |
| 3,091,713 | 5/1963 | Latta | 310/154 |
| 3,631,277 | 12/1971 | Ferdig | 310/154 |
| 3,790,830 | 2/1974 | Bonfiglio | 310/154 |
| 4,137,884 | 2/1979 | Odazima et al. | 310/153 |
| 4,383,193 | 5/1983 | Tomite et al. | 310/154 |
| 4,542,314 | 9/1985 | Corbach et al. | 310/154 |
| 4,580,072 | 4/1986 | Morishita | 310/42 |

FOREIGN PATENT DOCUMENTS

113707 2/1974 Japan.
57-16561 1/1982 Japan.

Primary Examiner—Patrick R. Salce
Assistant Examiner—D. L. Rebsch
Attorney, Agent, or Firm—Antonelli, Terry & Wands

[57] ABSTRACT

A plurality of permanent magnets (4) are disposed with gaps between adjacent magnets along the inner peripheral surface of a yoke (2) of a stator for a magneto D.C. motor. In gaps between magnets, there are provided retainers (3), ech of which is made of an elastic member and consists of one surface (11) fixed on the yoke, two surfaces (12, 13) extending in the central axial direction of the D.C. motor along the side facing surfaces (71, 72) of the magnets opposite to each other on the inner peripheral surface of the yoke and two end portions (32) connecting these two surfaces (12, 13). Those two surfaces (12, 13) and end portions (32) are kept in contact with the permanent magnet from three directions, namely from both facing surfaces (71, 72) of the permanent magnet and from each of the outer surfaces (81, 82) of the magnets adjacent to each facing surface (71, 72) extending in the central axial direction, whereby the permanent magnets are pressed and clamped so as to be secured to the yoke.

3 Claims, 6 Drawing Sheets

# MAGNETO D.C. MOTOR HAVING ELASTIC MAGNET MOUNTING RETAINERS

FIELD OF THE INVENTION

This invention relates to a magneto D.C. motor, and more particularly, to a stator for a magneto D.C. motor in which magnets are fixed to a yoke firmly without using an adhesive.

BACKGROUND OF THE INVENTION

A magneto dynamo in which magnets are fixed to a yoke by using an elastic material for the inner periphery of the magnets has been proposed.

As this kind of magneto dynamo, there exists, for example, "ROTOR FOR MAGNETO DYNAMO" disclosed in Japanese Laid-Open No. 16561/1982, Jan. 28, 1982.

In this magneto dynamo magnets are secured to a yoke simply by pressing the magnets from the inner periphery to the outside by retainers, the securing strength of the magnets with respect to the yoke is not necessarily sufficient and there is the problem of resistance to vibration.

Further, a magneto D.C. motor in which magnets are secured to a yoke by inserting an elastic member between magnets has been known.

As for this kind of magneto dynamo, there exists, for example, "DYNAMO", which was laid open in Japan on Sept. 6, 1982.

In this magneto D.C. motor, disclosed in Japanese Laid-Open No. 113707/1975, magnets are supported by arms provided on retainers, and there is also a problem similar to that of the magneto dynamo disclosed in Japanese Laid-Open No. 16561/1982.

SUMMARY OF THE INVENTION

Accordingly, it is an object of the invention to provide a magneto D.C. motor which retains a strength of a yoke and magnets and which can resist vibration sufficiently from the viewpoint of strength.

To this end, a magneto D.C. motor comprises a stator consisting of a plurality of permanent magnets disposed on the inner periphery of a yoke; and retainers made of an elastic material, each of the retainers having two axially extending supporting parts and being secured to the yoke in the gap between the permanent magnets. The two supporting parts of the retainer extend in the central axial direction of the D.C. motor securing the permanent magnets to the yoke by pressing and clamping the magnets, in close contact with the magnets from three directions, namely from each facing surface of the magnets and each outer surface of the magnets adjacent to each of the facing surfaces.

The present invention can easily accomplish the objective, because, according to the invention, permanent magnets are, in the manner described above, pressed and clamped from three directions by elastic member which are secured to a yoke by plastically deformed portions thereon.

DETAILED DESCRIPTION OF THE PREFERRED EMBODIMENTS

Figure 1:
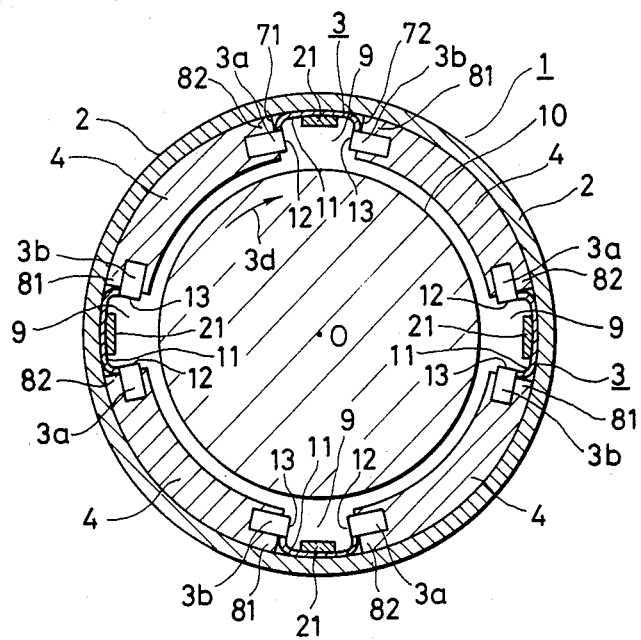
FIG. 1 is a front view of a stator for a magneto D.C. motor according to the invention, the magnetic poles of which are composed of only permanent magnets.

Referring to FIG. 1, a stator 1 consists of a cylindrical yoke 2 and a plurality of permanent magnets 4 disposed on the inner periphery thereof. A rotor 10 rotating around the central axis O of the stator 1 by excitation is provided inside the stator 1.

Permanent magnets 4 are disposed on the inner periphery of the yoke 2 with a gap 9 between two adjacent magnets.

Figure 2:
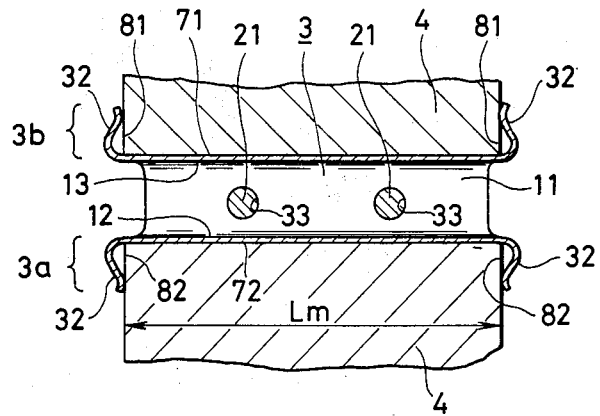
FIG. 2 shows in detail one of the retainers shown in FIG. 1.

The permanent magnets are secured to the yoke 2, as can be seen from FIGS. 1, 2, by fixing one surface 11 of a retainer 3 made of an elastic material and having a U-like configuration in cross section, on the yoke 2.

On the retainer 3 are formed supporting parts 3a, 3b extending in the direction of the central axis O, to thereby clamp the permanent magnets 4 for the purpose of elastically retaining and fixing the permanent magnets 4 by the retainers 3 made of the elastic material.

The supporting parts 3a, 3b consist of two surfaces 12, 13 extending in the direction of the central axis of the D.C. motor along facing surfaces 71, 72 of the magnets 4 opposite to each other across the gap 9 and end portions 32 which are made of the elastic material and are provided along the outer surfaces 81, 82 of the permanent magnets 4 extending in the direction of the central axis of the D.C. motor. These two surfaces 12, 13 and the end portions 32 elastically retain the permanent magnets 4.

Both ends of the end portions 32 of the supporting parts 3a, 3b are elastic portions 32 having a substantially S-shaped configuration, which clamp the outer surfaces 81, 82 of the magnets proximate the facing surfaces 71, 72 of the permanent magnets, opposite each other across the gap 9 on the inner periphery of the yoke 2.

In this way, according to the present invention, the supporting parts 3a, 3b secure the permanent magnets 4 to the yoke 2 by pressing and clamping the magnets while being in contact with them from three directions, namely from each facing surfaces 71, 72 of the permanent magnets 4 and from the outer surfaces 82, 82 of the magnets adjacent to the facing surfaces 71, 72.

Figure 12:
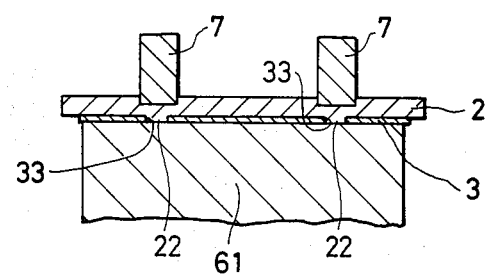
FIG. 12 shows a method of securing a retainer to a yoke in the invention.

Referring to FIG. 12, the retainer 3 having bores 33 on the inner periphery of the cylindrical yoke 2 is secured to the yoke 2 by inserting a yoke having protrusions 21 or 22 into the plurality of the bores 33 of the retainer 3 from the outer periphery of the yoke 2. Protrusions 21, 22 are formed by pressing members 7 against the outer surface of yoke 2, resulting in a plastic deformation of the yoke into bores 33 after the retainer is set on a mold 61. The retainer 3 secured to the yoke 2 by plastic deformation bonding in this way enhances the retaining strength of the magnet all the more.

A method of fixing a permanent magnet 4 and an auxiliary pole 5 on a yoke 2 will be described with reference to FIGS. 3, 4 and 5, in the following.

A retainer 3 made of elastic material and having a U-like configuration in cross section is first secured to the yoke 2. On the retainer 3, supporting parts 3a, 3b extending in a direction of the central axis have previously been formed, one supporting part 3a for clamping the permanent magnet 4 and the other supporting part 3b for clamping the auxiliary pole 5. All of these are elastically retained and fixed by the retainer 3 made of the elastic material in the manner shown in FIGS. 1, 2.

Figure 3:
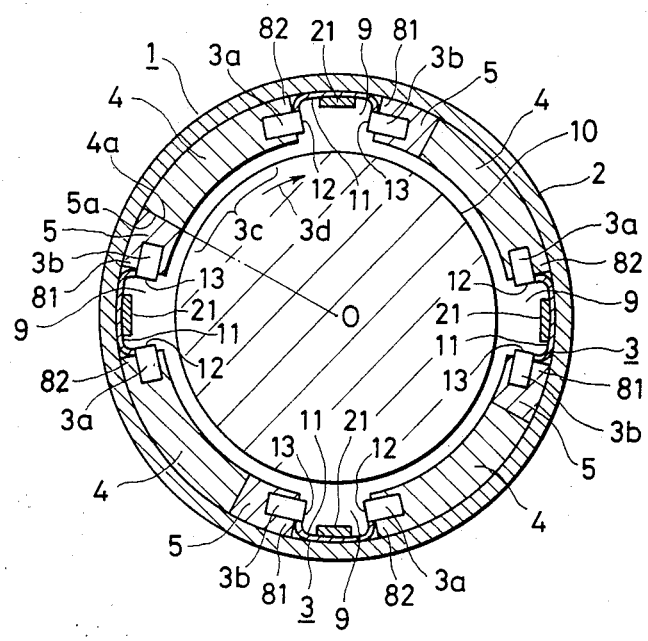
FIG. 3 is a front view of a stator for another embodiment of a magneto D.C. motor according to the invention, the magnetic poles of which are composed of permanent magnets and auxiliary poles.
Figure 4:
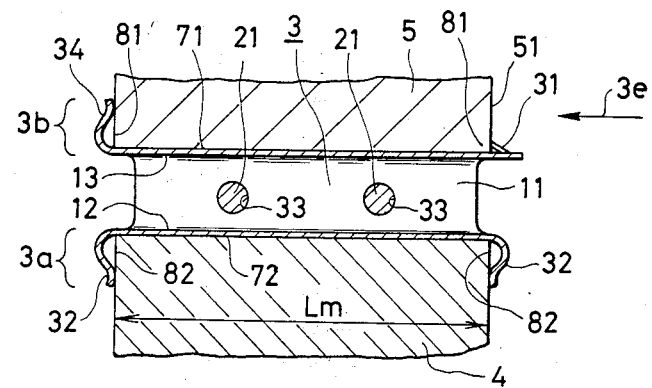
FIG. 4 shows in detail one of the retainers shown in FIG. 3.
Figure 5:
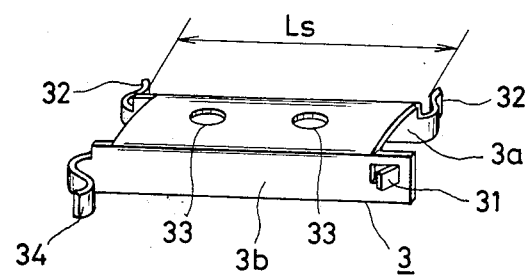
FIG. 5 is a perspective view of the retainer shown in FIG. 4.

The supporting parts 3a, 3b extend in the axial direction, i.e. in a direction lateral to the surface of the stator 1 in FIG. 3, or such as to retain the permanent magnet 4 and the auxiliary pole 5, respectively, from the right and left in FIGS. 4, 5. In the embodiment, both ends of the supporting part 3a for retaining the permanent magnet 4 are elastic portions 32 having a substantially S-like configuration, which clamp the magnets 4. One end of the supporting part 3b is an elastic portion 34 having a substantially S-like configuration, and at one position of the other end an engaging pawl 31 is formed such as to clamp the auxiliary pole between the elastic portion 34 and the pawl 31.

In assembly, the permanent magnet 4 is inserted into the supporting part 3a from the peripheral direction so as to be retained. That is, the permanent magnet 4 is inserted into a part 3c between the supporting part 3a and the supporting part 3b shown in FIG. 3, namely the part 3c into which the magnet can be inserted without being interrupted by the supporting parts 3a and 3b, and next moved in the peripheral direction as indicated by the arrow 3d in order to insert the permanent magnet 4 into the supporting part 3a such as to be clamped by both elastic portions 32 of the supporting part 3a. Subsequently, the auxiliary pole 5 made of soft-iron is inserted in the direction indicated by the arrow 3e in FIG. 4, namely in a direction from the back surface to the front surface of the stator 10 in FIG. 3. In this way the auxiliary pole 5 is inserted while pushing the pawl 31 such as to flatten the pawl. When the rear end 51 of the auxiliary pole 5 has passed the pawl 31, the pawl 31 rises to engage the rear end 51 as shown in FIG. 4. As a result, the auxiliary pole 5 is clamped so as to be retained between the elastic portion 34 and the pawl 31.

The permanent magnet 4 is formed such that a side surface extending in the axial direction, namely an axial side surface 4a, lies in a plane tangential to a radial line extending from the center O of the yoke 2. In other words, the surface 4a is made to be a surface approximately agreeing with the line from the center O. The side surface 5a of the auxiliary pole 5 is also made to lie in a radially tangential plane. Therefore, both surfaces 4a, 5a are in contact with each other. Further, since the retainer 3 is formed in a substantially U-shaped configuration in cross section, the permanent magnet 4 and the auxiliary pole 5 can be fixed by pressing the retainer 3 between the permanent magnet 4 and the auxiliary pole 5 while deflecting the U-like configuration in cross section, and by pressing the permanent magnet 4 and the auxiliary pole 5 with this tension.

As is obvious from the above description, in the embodiment, by providing the surfaces 5a, 4a contacting the radial line directing toward the center of the axis on the auxiliary pole 5 and the permanent magnet 5, the tension of the retainer 3 acts effectively so as to press the permanent magnet 4 to the inner peripheral of the yoke 2.

In addition, as described above, this retainer 3 is made such that the permanent magnet 4 is inserted from the periphery direction and the auxiliary pole 5 from the axial direction, so as to clamp the permanent magnet 4 between both elastic portions 32 and the auxiliary pole 5 between the pawl 31 and the elastic portion 34. This assembly operation is very easy and after the assembly it is securely retained due to the elastic force.

It is also possible to insert a rolled-up belt-like metal leaf into a gap between the permanent magnet 4 and the auxiliary pole 5 while keeping the metal leaf in close contact with the inner periphery of the auxiliary pole 5 so as to prevent each part from springing to the inside.

The retainer 3 in the embodiment is made of an elastic steel sheet. The metal leaf above described can be made of the elastic sheet. An elastic material other than metal can also be used if it has a similar elasticity.

In the embodiment, the axial length Lm of the permanent magnet 4 and the length Ls of the clamping portion 3 shown in FIGS. 4, 5 are set such as to satisfy the following condition:

$$Lm > Ls,$$

and such as to clamp the permanent magnet 4, in the combination of both, with an adequate pressure. Similarly, an adequate clamping pressure is set to the auxiliary pole 5.

In this way, the embodiment is effective in securely retaining the permanent magnet 4 and auxiliary pole 5 on the yoke 2. Furthermore, by fixing the retainer 3 on the yoke 2 mechanical out-of-roundness of the yoke is less variable and the inner diameter of the permanent magnet can be maintained with higher accuracy. The gap between the stator 1 the an armature should be small and uniform from the viewpoint of performance, but when the out-of-roundness of the stator 1 increases, some part of the gap becomes large, resulting in reduced performance. For example, according to conventional fixing by bonding, since the magnet and the yoke expand separately, the yoke on the outer side expands at the time of heating for the purpose of bonding, and if they are bonded under this state, the curvature radius of the bonding part is large while that of the part is small, i.e. the out-of-roundness is increased. This embodiment, however, is free from such a problem.

In experiments of dropping a one-pound steel ball, the conventional structure in which the magnet is fixed on the yoke by bonding produced a crack when it was dropped from a height of 30–40 cm, whereas this embodiment did not produce a crack unitl it was dropped from a height of 70 cm. Some samples did not produce a crack until the steel ball was dropped from a height of 90 cm.

As described above, this invention in which a retainer made of an elastic material retains a permanent magnet and an auxiliary pole by pressing them to the inner periphery of a yoke has the following advantages: the assembly process is easy; the structure is simple; the permanent magnet is not broken by thermal shock or impact; and high reliability is obtained by a sufficient retaining force.

Figure 6:
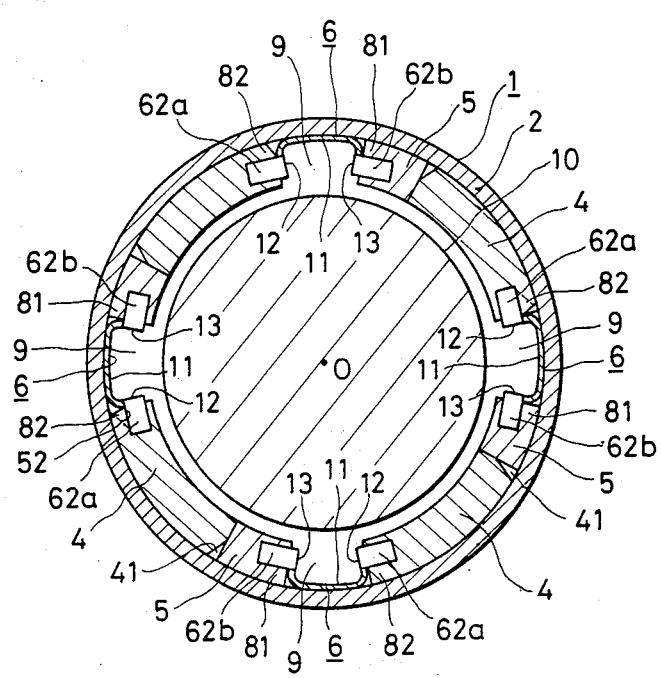
FIG. 6 is a front view of a stator for a second embodiment of a magneto D.C. motor, the magnetic pole of which is composed of permanent magnets and auxiliary poles.
Figure 7:
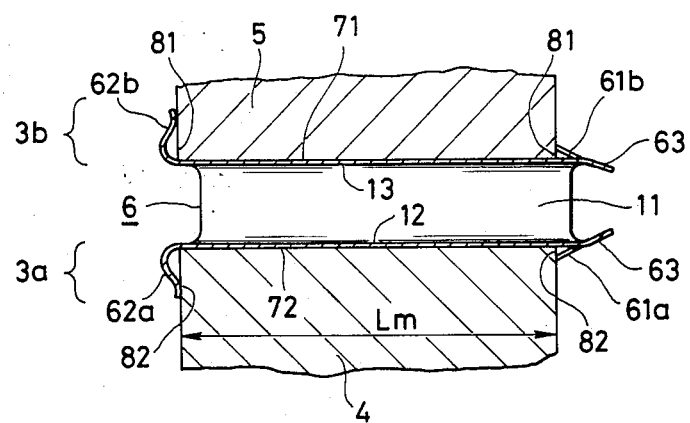
FIG. 7 shows in detail one of the retainers shown in FIG. 6.
Figure 8:
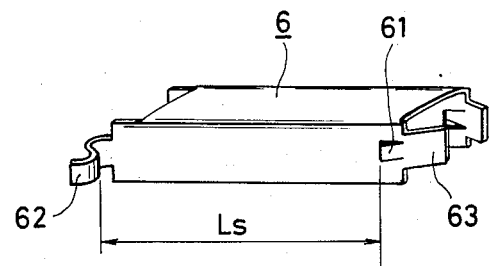
FIG. 8 is a perspective view of the retainer shown in FIG. 7.

Next, a second embodiment of the invention will be described with reference to FIGS. 6 to 8.

In this embodiment, an auxiliary pole 5 is fixed on the inner periphery of a yoke 2. For example, the auxiliary pole 5 is fixed by welding or the like or the auxiliary pole 5 and the yoke 2 are united into one body by cold forging. A permanent magnet 4 is secured to said yoke 2 and said auxiliary pole 5 by a retainer 6 which is made of an elastic member. That is, the permanent magnet 4 in contact with the auxiliary pole 5 with the retainer 6 disposed between them and the permanent magnet 4 is fixed by pressure due the elastic force of the retainer 6.

In the course of assembly, with the axial side surface of the permanent magnet 4 in contact with the auxiliary pole 5, namely with the permanent magnet 4 at a predetermined position, the retainer 6 made of the elastic member is inserted into the gap between the auxiliary pole 5 and the permanent magnet 4 from the axial direction, and the fixing is completed when the movement of the permanent magnet 4 in the axial direction is prevented.

In this embodiment as well as the above embodiment, the axial side surface 4a of the permanent magnet 4 is made to lie in a radially tangential plane and the side surface 5a of the auxiliary pole 5 is also made to lie in a radially tangential plane such that both surfaces may be in contact with each other. The permanent magnet 4 and the auxiliary pole 5 can be fixed by pressing the retainer 6 which has been made in a U-like configuration in cross section between the permanent magnet 4 and the auxiliary pole 5 while deflecting the U-like configuration in cross section, and by pressing the permanent magnet 4 to the auxiliary pole 5 with this tension. As is obvious from the above description, in the embodiment, by providing the surfaces which are in contact with the radial line directing toward the center of the axis, on the auxiliary pole 5 and the permanent magnet 4, the tension of the retainer 6 acts effectively, so as to press the permanent magnet 4 to the inner periphery of the yoke 2, whereby a secure fixing is accomplished.

One end portion 63 of the retainer 6 is tapered so as to make its insertion easy. This facilitates insertion at the time of assembly. Further, in order to prevent axial movement of the permanent magnet 4, a retaining protrusion 61a is provided on the side surface of the fore end portion of the insertion side, and a compression elastic portion 62a having a substantially S-shaped configuration is provided on the other end portion. The protrusion 61a is formed by cutting and raising a pawl as is shown in the drawing. As a result, the permanent magnet 4 is clamped between the compression elastic portion 62a and the protrusion 61a. In this way, the permanent magnet 4 is clamped due to the elastic force from the compression elastic portion 62a on one end portion and the protrusion 61a for retaining the compression on the other hand. On the side for clamping the auxiliary pole 5 also, similar compression elastic portion 62b and protrusion 61b are formed. In this structure, the auxiliary pole 5 which is fixed on the yoke 2 is first clamped by the elastic force of the compression elastic portion 62b and the protrusion 61b such as to prevent the movement of the retainer 6, and the permanent magnet 4 is next clamped similarly, which prevents movement of the permanent magnet 4.

In addition, in this embodiment, in order to make insertion easy, a notch 41 is made on a part of the surface of the permanent magnet 4 which contacts the auxiliary pole 5.

Unlike the embodiments above described, according to this embodiment, it is not necessary to insert a protruded molded portion as is indicated by the numeral 2 in FIG. 3. Therefore it does not involve the risk of changing the degree of roundness in yoke 2 when such protruded molded product is formed, which secures the inner diameter of the permanent magnet 4 with high accuracy.

In this embodiment also, the axial length Lm of the permanent magnet 4 and the length Ls of the clamping portion 3 are set such as to satisfy the following condition:

$$Lm > Ls,$$

and such as to clamp the permanent magnet 4, in the combination of both, with an adequate pressure. A similar dimension is set for the auxiliary pole 5, so as to clamp the auxiliary pole 5 by an adequate clamping pressure.

Figure 9:
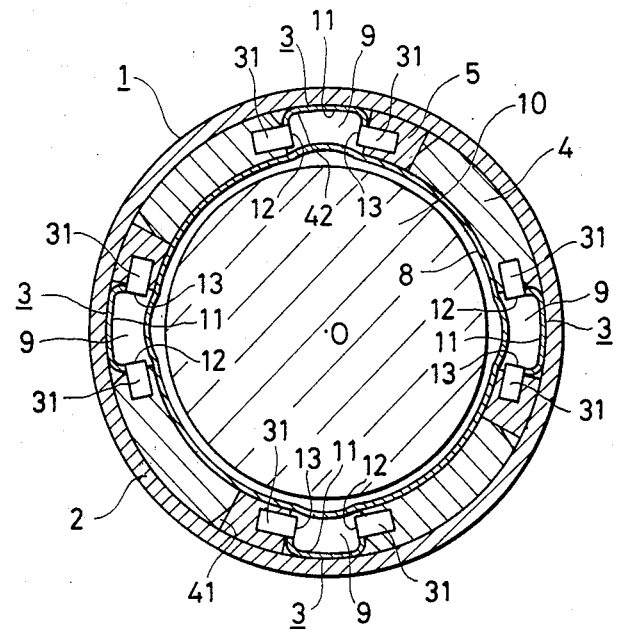
FIG. 9 is a front view of a stator for a third embodiment of a magneto D.C. motor according to the invention, the magnetic poles of which are composed of permanent magnets and auxiliary poles.
Figure 10:
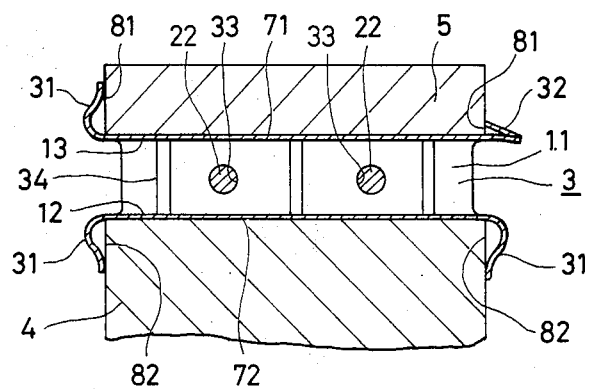
FIG. 10 shows in detail one of the retainers shown in FIG. 9.
Figure 11:
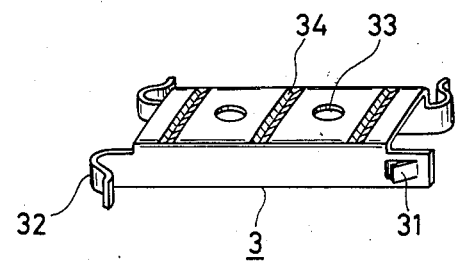
FIG. 11 is a perspective view of the retainer shown in FIG. 10.

FIG. 9 shows a third embodiment of the invention. An elastic steel belt 8 slightly longer than the entire length of the inner periphery is inserted into the inner periphery of magnetic poles, and disposed in the gaps between the magnetic poles by deflecting and pressing it from the inner periphery side and butting both ends of the belt such as to prevent the movement of the magnetic poles.

In this structure, the axial side surfaces of a permanent magnet 4 and an auxiliary pole 5 lie in tangential planes 41 extending radially from the center such that these surfaces may contact each other. Further, due to the tension caused by pressing and disposing a retainer 3, which has a U-like configuration in cross section, between the permanent magnet 4 and the auxiliary pole 5 while deflecting the U-like configuration in cross section, the permanent magnet 4 and the auxiliary pole 5 are secured to a yoke 2. In other words, the tension of the retainer 3 is made effective in pressing the magnetic poles in the outer peripheral direction by having the side surface lie in the radially tangential planes. In addition, a plurality of reinforcing ribs 34 are provided on the retainer 3. When the width of the retainer 3 is narrow due to unequal dimensions of insertion, the bending parts 42 become large curves R and the retainer 3 works loose.

The reinforcing ribs 34 are provided so as to prevent such a loose retainer 3 from projecting to the inner surface and to increase the accuracy of the inner diameter.

What we claim is:

1. A magneto D.C. motor with a magnet mounting retainer comprising: a stator having a plurality of arcuate permanent magnets disposed annularly on the inner periphery of a cylindrical yoke with gaps between two adjacent magnets; a rotor which rotates around the central axis of said stator by excitation; retainers, each of which comprises a surface contacting the inner periphery of said yoke in said gap, said surface having bores therethrough, said cylindrical yokebeing plastically deformed at prescribed locations thereof so as to have protrusions extending from the inner periphery thereof, said protrusions being inserted into the bores of said retainer so as to secure said retainers to the inner periphery of said cylindrical yoke, the surface of each retainer being connected with two radially extending surfaces thereof, and being made of an elastic material, and extending in a direction of the central axis of said D.C. motor along facing surface of said magnets opposite to each other across said gap, and two end portions which are connected to said two radially extending surfaces, respectively, made of an elastic member, and extending along outer surfaces of said magnets adjacent to said facing surfaces; said two radial extending surfaces and said two end portions securing said permanent magnets to said yoke by pressing and clamping said magnets while contacting said magnets from three directions, namely, from said facing surfaces and said outer surfaces, and wherein said retainer has, on the surface contacting said yoke, reinforcing ribs which are formed along the peripheral direction of said yoke.

2. A magneto D.C. motor comprising:

a stator having a plurality of arcuate permanent magnets disposed annularly along the inner periphery of a cylindrical yoke with gaps between two adjacent magnets, each of said magnets having a side surface extending in an axial direction of the motor;

a plurality of auxiliary poles disposed along the inner periphery of the yoke and along each said side surface of said magnets such that a side surface of said auxiliary poles is disposed in planar contact with said side surface of an adjacent one of said magnets;

a rotor which rotates around a central axis of said stator by excitation;

a plurality of magnet and auxiliary pole mounting retainer means, each of which has a surface contacting the inner periphery of said yoke in each said gap, said surface having bores therethrough, said cylindrical yoke being plastically deformed at prescribed locations thereof so as to have protrusions extending from the inner periphery thereof, said protrusions being inserted into the bores of said mounting retainer means so as to secure said mounting retainer means to the inner periphery of said cylindrical yoke, and said mounting retainer means having two radially directed surfaces made of an elastic material extending parallel to the central axis of the stator and along opposed facing surfaces of said auxiliary poles and adjacent magnets across the gaps, and elastic portions connected at the ends of said two radially directed surfaces so as to extend along outer surfaces of said auxiliary poles and magnets adjacent to said facing surface;

one of said two radially directed surfaces and elastic portions at each end thereof securing each of said magnets to said yoke by contacting said magnets from opposed facing surfaces and said outer surfaces so as to clamp therebetween one of said magnets which has been inserted into the stator between said elastic portions and said one radially directed surface from the peripheral direction of the yoke; and the other of said two radially directed surfaces and one of said elastic portions at an end thereof and a pawl formed at the other end thereof securing each of said auxiliary poles to said yoke by clamping therebetween one of said auxiliary poles which has been inserted into the stator from a direction parallel to said other radially directed surface from said pawl to the elastic portion at the one end of said other radially directed surface.

3. A magneto D.C. motor comprising:

a stator having a plurality of arcuate permanent magnets disposed annularly along the inner periphery of a cylindrical yoke with gaps between adjacent magnets, each of said magnets having a side surface extending in an axial direction of the motor;

a plurality of auxiliary poles secured to the inner periphery of the yoke and disposed along each said side surface of said magnets with an elastic retainer disposed in a gap between adjacent surface of respective magnets and auxiliary poles;

a rotor which rotates around a central axis of said stator by excitation;

a plurality of magnet mounting retainer means, each of which has a surface contacting the inner periphery of said yoke in each said gap, and two radially directed surfaces made of an elastic material extending parallel to the central axis of the stator and along opposed facing surfaces of said auxiliary poles and adjacent magnets across the gaps, elastic portions connected at one end of said two radially directed surfaces so as to extend along outer surfaces of said auxiliary poles and magnets adjacent to said facing surfaces, and pawls connected at the other end of said two radially directed surfaces to permit said magnets to be inserted parallel to one of said radially directed surfaces from said pawl to the elastic portion at the one end of said one radially directed surface.

* * * * *